(12) United States Patent
Baccaro et al.

(10) Patent No.: US 10,696,014 B2
(45) Date of Patent: Jun. 30, 2020

(54) MULTI-LAYER FILM

(71) Applicant: SABIC GLOBAL TECHNOLOGIES B.V., Bergen Op Zoom (NL)

(72) Inventors: Lucio Baccaro, Geleen (NL); Attilio Scala, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 16/461,439

(22) PCT Filed: Dec. 21, 2017

(86) PCT No.: PCT/EP2017/083989
§ 371 (c)(1),
(2) Date: May 16, 2019

(87) PCT Pub. No.: WO2018/115224
PCT Pub. Date: Jun. 28, 2018

(65) Prior Publication Data
US 2019/0344532 A1 Nov. 14, 2019

(30) Foreign Application Priority Data
Dec. 21, 2016 (EP) .................................. 16205657

(51) Int. Cl.
| | | |
|---|---|---|
| *B32B 27/08* | (2006.01) | |
| *B32B 7/022* | (2019.01) | |
| *B29C 48/08* | (2019.01) | |
| *B29C 48/21* | (2019.01) | |
| *B29C 48/00* | (2019.01) | |
| *A01F 25/13* | (2006.01) | |
| *B32B 27/32* | (2006.01) | |
| *B29K 23/00* | (2006.01) | |
| *B29K 105/00* | (2006.01) | |

(52) U.S. Cl.
CPC .............. *B32B 7/022* (2019.01); *A01F 25/13* (2013.01); *B29C 48/0018* (2019.02); *B29C 48/08* (2019.02); *B29C 48/21* (2019.02); *B32B 27/08* (2013.01); *B32B 27/32* (2013.01); *B29K 2023/0633* (2013.01); *B29K 2023/08* (2013.01); *B29K 2105/0094* (2013.01); *B29K 2995/0063* (2013.01); *B32B 2250/05* (2013.01); *B32B 2250/242* (2013.01); *B32B 2307/72* (2013.01); *B32B 2307/732* (2013.01); *B32B 2410/00* (2013.01)

(58) Field of Classification Search
CPC ..... A01F 25/13; B29C 48/0018; B29C 48/08; B29C 48/21; B29K 2023/0633; B29K 2023/08; B29K 2105/0094; B29K 2995/0063; B32B 2250/05; B32B 2250/242; B32B 2307/72; B32B 2307/732; B32B 2410/00; B32B 27/08; B32B 27/32; B32B 7/022
See application file for complete search history.

(56) References Cited

U.S. PATENT DOCUMENTS

| | | | |
|---|---|---|---|
| 2001/0014401 A1 | 8/2001 | Bonke et al. | |
| 2007/0275196 A1* | 11/2007 | Opuszko .................. | B32B 7/02 428/35.2 |
| 2011/0311792 A1 | 12/2011 | Batra et al. | |
| 2013/0211356 A1* | 8/2013 | Nishikawa ........ | A61F 13/55115 604/365 |

FOREIGN PATENT DOCUMENTS

| | | |
|---|---|---|
| EP | 2286658 A2 | 2/2011 |
| WO | 2013081742 A1 | 6/2013 |
| WO | 2018096015 A1 | 5/2018 |
| WO | 2018096016 A1 | 5/2018 |

OTHER PUBLICATIONS

Andrew J. Peacock, "Handbook of Polyethylene: Structures, Properties and Applications," Marcel Dekker, Inc., New York, 2000, pp. 43-66.
Butler, "Film Extrusion Manual" 2nd Edition; 2005;413-435.
European Search Report for European Application No. 16205657.6, Filing Date Dec. 21, 2017, 2 pages.
International Search Report for International Application No. PCT/EP2017/083989, International Filing Date Dec. 21, 2017, dated Feb. 8, 2018, 4 pages.
Written Opinion for International Application No. PCT/EP2017/083989, International Filing Date Dec. 21, 2017, dated Feb. 8, 2018, 6 pages.

* cited by examiner

*Primary Examiner* — Lawrence D Ferguson
(74) *Attorney, Agent, or Firm* — Cantor Colburn LLP

(57) ABSTRACT

The present invention concerns a multi-layer film comprising at least five layers, with two outer layers, two intermediate layers and one core layer, wherein the core layer comprises an ethylene copolymer having a density between ≥0.910 g/cm3 and 0.925 g/cm3, the intermediate layers comprise an ethylene copolymer comprising 1-octene and having a density between >0.915 g/cm3 and 0.925 g/cm$^3$, wherein further the first outer layer comprises between 65 wt. % and 93 wt. % of a first ethylene copolymer comprising 1-octene and having a density between >0.915 g/cm3 and 0.925 g/cm$^3$ and between 7 wt. % and 35 wt. % of a second ethylene copolymer having a density between >0.925 g/cm$^3$ and 0.945 g/cm3 based on the total weight of polymers of the layer, wherein further the second outer layer comprises between 35 wt. % and 65 wt. % of a first ethylene copolymer comprising 1-octene and having a density between >0.915 g/cm$^3$ and 0.925 g/cm$^3$ and between 35 wt. % and 65 wt. % of a second ethylene copolymer having a density between 0.850 g/cm$^3$ and <0.915 g/cm$^3$ based on the total weight of the polymers of the layer.

20 Claims, No Drawings

MULTI-LAYER FILM

CROSS REFERENCE TO RELATED APPLICATIONS

This application is a 371 of International Application No. PCT/EP2017/083989, filed Dec. 21, 2017, which is incorporated by reference in its entirety, and which claims priority to European Application Serial No. 16205657.6 filed Dec. 21, 2016.

The invention relates to a multi-layer film, especially for silage film application, a silage comprising said film and the use of said film.

Films for silage film applications may be used wrap silages. Film for silage film applications can thereby protect the content.

Films for silage film applications are thereby known, for example from EP2286658, which describes a film comprising at two different ethylene-vinyl acetate based copolymers.

However, despite previous research in the field, there is always a continuous need for films with a good toughness and/or good dart impact and/or good cling/adhesion properties, especially for example stable cling/adhesion properties over time, and/or are easy to produce.

Therefore, it is the object of the invention to provide multi-layer films having a good toughness and/or good dart impact and/or good cling/adhesion properties, especially for example stable cling/adhesion properties over time, and/or are easy to produce.

This object is achieved by a multi-layer film comprising at least five layers, with two outer layers, two intermediate layers and one core layer, wherein the core layer comprises an ethylene copolymer having a density between ≥0.910 g/cm$^3$ and 0.925 g/cm$^3$, the intermediate layers comprise an ethylene copolymer comprising 1-octene and having a density between >0.910 g/cm$^3$ or >0.915 g/cm$^3$ and 0.925 g/cm$^3$, wherein further the first outer layer comprises either a polyethylene, especially a low density polyethylene, with a density between 0.915 g/cm$^3$ and 0.935 g/cm$^3$ or comprises between 65 wt. % and 93 wt. % of a first ethylene copolymer comprising 1-octene and having a density between >0.915 g/cm$^3$ and 0.925 g/cm$^3$ and between 7 wt. % and 35 wt. % of a second ethylene copolymer having a density between >0.925 g/cm$^3$ and 0.945 g/cm$^3$ based on the total weight of polymers of the layer, wherein further the second outer layer comprises between 35 wt. % and 65 wt. % of a first ethylene copolymer comprising 1-octene and having a density between ≥0.910 g/cm$^3$ or >0.915 g/cm$^3$ and 0.925 g/cm$^3$ and between 35 wt. % and 65 wt. % or 75 wt. % of a second ethylene copolymer having a density between 0.850 g/cm$^3$ and <0.915 g/cm$^3$ based on the total weight of the polymers of the layer.

This may especially allow good cling properties, especially for example stable cling/adhesion properties over time, and/or simplify/ease the production. The film according to the invention may there preferably comprise only polyolefins and thus no polyisobutylene (PIB).

This advantageously allows for good cling properties and/or good adhesion properties, especially cling/adhesion properties that may be stable over time as they do not depend on the migration of PIB.

With outer layers are meant the layers that are located on the outside of the film. The outer layers may thus preferably adjacent to only one other layer of the multi-layer film according to the invention on only one of their sides. As compared to other layers in the multi-layer film of the invention, the outer layers have a substantially larger portion of the layer that faces the outside. With core layer is meant a layer that is located between at least two outer layers and/or at least two intermediate layers, preferably in the middle of the multi-layer arrangement of the multi-layer film according to the invention, especially when the multi-layer film is film with at least five or exactly five layers. Intermediate layer may thereby designate a layer that is located between at least one outer layer and at least one core layer. An intermediate layer may thereby be adjacent to at least outer layer and/or at least one core layer.

With adjacent layer, as used herein, is meant a layer that is in direct contact with the layer to which it is described as adjacent. In direct contact may thereby mean that preferably no further layer is arranged between two layers which are in direct contact. Each adjacent layer to an outer layer, would therefore be in direct contact with that outer layers. A layer adjacent to at least one outer layer may thereby be for example an intermediate layer. A layer adjacent to at least one intermediate layer may thereby be for example a core layer.

The five layers of a multi-layer film according to the invention may preferably be adjacent to each other. This may mean that the core layer is in direct contact with both intermediate layers and that each intermediate layer is in direct contact with one of the outer layers.

An ethylene copolymer may be a copolymer of ethylene and at least one α-olefin, preferably for example an α-olefin with 3 to 10 carbon atoms (C3-C10 alpha-olefin), such as for example 1-butene, 1-pentene, 1-hexene, 1-octene, or 4-methyl-1-pentene, most preferably 1-butene, 1-hexene or 1-octene.

A polyethylene according to the invention may be a high density polyethylene (HDPE), a low density polyethylene (LDPE) or a linear low density polyethylene (LLDPE), preferably an LDPE. An LDPE may thereby be produced for example in a high pressure autoclave reactor or in a tubular reactor.

In a multi-layer film according to the invention, the first outer may comprise for example between 70 wt. % and <93 wt. %, preferably between >75 wt. % and <90 wt. % of the first ethylene copolymer comprising 1-octene and between >7 wt. % and 30 wt. %, preferably between >10 wt. % and <25 wt. %, of the second ethylene copolymer based on the total weight of polymers of the layer. This may further contribute to good toughness and/or good dart impact and/or good cling properties.

In a multi-layer according to the invention, the second outer layer may comprise for example between 40 wt. % and 60 wt. %, preferably between >40 wt. % and <60 wt. %, of the first ethylene copolymer comprising 1-octene and between 40 wt. % and 60 wt. %, preferably between >40 wt. % and <60 wt. %, of the second ethylene copolymer based on the total weight of the polymers of the layer. This may further contribute to good toughness and/or good dart impact and/or good cling properties.

In a multi-layer according to the invention, the core layer and/or each intermediate layer may comprise for example between 90 wt. % and 100 wt. %, preferably 100 wt. %, of their respective ethylene copolymer based on the total weight of the polymers of the layer. This may further contribute to good toughness and/or good dart impact and/or good cling properties.

In a multi-layer film according to the invention, the multi-layer film may consist of five layers and/or both outer layers may comprise the same first ethylene copolymer and/or the multi-layer film and/or each of the five layers according to the invention may comprise only polyolefins as polymers and/or the multi-layer film may preferably comprise no polypropylene and/or the multi-layer film may preferably comprise no ethylene and vinyl acetate copolymer and/or no ethylene and vinyl alcohol copolymer and/or the multi-layer film may preferably be a multi-layer film for silage film applications.

In a multi-layer film according to the invention, the ethylene copolymer of the core layer comprises 1-hexene or 1-octene. This may contribute to good toughness and/or good dart impact and/or good cling properties.

In a multi-layer film according to the invention, the second ethylene copolymer of the first outer layer may comprise 1-hexene or 1-octene. This may contribute to good toughness and/or good dart impact and/or good cling properties.

In a multilayer film according to the invention, the second ethylene copolymer of the second outer layer may comprise 1-hexene or 1-octene. This may contribute to good toughness and/or good dart impact and/or good cling properties.

In a multi-layer film according to the invention, the density of the ethylene copolymer of the core layer may be between 0.913 and 0.923 g/cm$^3$, preferably between >0.913 and <0.923 g/cm$^3$ and/or the melt flow rate of the ethylene copolymer of the core layer may be between 0.2 and 2.5 g/10 min, preferably between 0.5 and 1.5 g/10 min.

In a multi-layer film according to the invention, the density of the ethylene copolymer of the intermediate layer may be between 0.916 g/cm$^3$ and 0.923 g/cm$^3$, preferably between >0.916 g/cm$^3$ and <0.923 g/cm$^3$ and/or the melt flow rate of the ethylene copolymer of the intermediate layer may be between 0.2 and 2.5 g/10 min, preferably between 0.5 and 1.5 g/10 min.

In a multi-layer film according to the invention, the density of the first ethylene copolymer of the first outer layer may be between 0.916 g/cm$^3$ and 0.923 g/cm$^3$, preferably between >0.916 g/cm$^3$ and <0.923 g/cm$^3$ and/or the melt flow rate of the ethylene copolymer of the intermediate layer may be between 0.2 and 2.5 g/10 min, preferably between 0.5 and 1.5 g/10 min.

In a multi-layer film according to the invention, the density of the first ethylene copolymer of the second outer layer may be between 0.916 g/cm$^3$ and 0.923 g/cm$^3$, preferably between >0.916 g/cm$^3$ and <0.923 g/cm$^3$ and/or the melt flow rate of the first ethylene copolymer of the second outer layer may be between 1 and 4 g/10 min, preferably between 2.5 and 3.5 g/10 min.

In a multi-layer film according to the invention, the density of the second ethylene copolymer of the first outer layer may be between 0.930 g/cm$^3$ and 0.940 g/cm$^3$, preferably between >0.930 g/cm$^3$ and <0.940 g/cm$^3$ and/or the melt flow rate of the second ethylene copolymer of the first outer layer may be between 1 and 4 g/10 min, preferably between 2.4 and <3.5 g/10 min.

In a multi-layer film according to the invention, the density of the second ethylene copolymer of the second outer layer may be between 0.855 g/cm$^3$ and 0.910 g/cm$^3$, preferably between 0.860 g/cm$^3$ and <0.900 g/cm$^3$, preferably between >0.860 g/cm$^3$ and <0.890 g/cm$^3$, and/or the melt flow rate of the ethylene copolymer of the second ethylene copolymer of the first outer layer may be between 0.2 and 2.5 g/10 min, preferably between 0.5 and 1 g/10 min.

In a multi-layer film according to the invention, the melt flow rate of the ethylene copolymer of the core layer may be lower than the melt flow rate of the ethylene copolymer(s) of each of the intermediate layers.

In a multi-layer film according to the invention, a polyethylene, especially a low density polyethylene (LDPE), may preferably have a density between 0.920 g/cm$^3$ and 0.930 g/cm$^3$ and/or preferably have a melt flow rate between 0.2 and 2 g/10 min, further preferred between 0.5 and 1.5 g/10 min. The amount of a polyethylene, especially of a LDPE, in the first outer layer may preferably be between >60 wt. % and 100 wt. %, preferably 75 wt. % and 99 wt. %, further preferred 85 wt. % and 95 wt. % based on the total weight of the polymers of the layer.

For the purpose of the invention, the density may be determined for example using ISO1873 (A) or ASTM-D 1505 or ASTM D 792.

For the purpose of the invention, the melt flow rate may be determined for example using ISO1133:2011 (190° C./2.16 kg) or ASTM D1238 (190° C./2.16 kg).

In the multi-layer film of the invention, the core layer and/or the intermediate layers and/or outer layers may for example comprise polyethylene, especially for example linear low density polyethylene and/or high density polyethylene and/or low density polyethylene and/or an ethylene copolymer and/or polypropylene and/or blends of two or more of thereof.

Besides polymers, each layer may also comprise other compounds. For example, each layer may especially further comprise additives as other compounds, especially for example additives as described herein.

A multi-layer film according to the invention may comprise at least one, preferably exactly one, core layer.

A multi-layer film according to the invention may comprise exactly five layers.

The production processes of LDPE, HDPE and LLDPE are summarized in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalyzed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

An ethylene copolymer according to the present invention may thereby especially be linear low density polyethylene (LLDPE) and/or a polyolefin plastomer and/or a polyolefin elastomer.

With linear low density polyethylene (LLDPE) as used herein is meant a low density polyethylene copolymer ethylene-alpha olefin copolymer) comprising ethylene and a C3-C10 alpha-olefin co-monomer (. Suitable alpha-olefin co-monomers include 1-butene, 1-hexene, 4-methyl-1-pentene and 1-octene.

Preferably, the alpha-olefin co monomer may be present for example in an amount of about 1 to about 25, preferably 5 to about 20 percent by weight of the ethylene-alpha olefin copolymer, preferably of 5 to about 20 percent by weight of the ethylene-alpha olefin copolymer, more preferably an amount of from about 7 to about 15 percent by weight of the ethylene-alpha olefin copolymer. LLDPE, as used herein, may be produced for example using metallocene and/or Ziegler-Natta catalysts.

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natta catalyst. According to another preferred embodiment, the LLDPE may be obtained by gas phase or slurry polymerization in the presence of a metallocene catalyst.

The components of the each layer according to the invention may preferably for example add up to 100 wt. % of the each layer or to 100 wt. % of the polymer content of each layer.

The thickness of multi-layer film of the invention may range for example from 2 to 200 μm, especially for example between 5 to 100 μm, preferably from 10 to 50 μm. Not all layers in the multi-layer film of the invention need to have the same thickness. For example, one or more layers in the multi-layer film may be thicker than the other layers, especially for example to increase the stability of the production process.

In a multi-layer film according to the invention, the thickness of each outer layer may represent between 10% and 20% of the total film thickness, preferably 15% of the total film thickness and/or the thickness of each intermediate layer may represent between 15% and 25% of the total film thickness, preferably 20% of the total film thickness and/or the thickness of the core layer may represent between 25% and 35% of the total film thickness, preferably 30% of the total film thickness.

Moreover, each layer of the multi-layer film of the invention may comprise an amount of additives of 0 to 25 wt. %, especially for example 1 to 10 wt. % especially for example 0 to 8 wt. % or 0.001 to 1 wt. % based on the total weight of the layer. The rest of each layer may thereby be made up of polymers.

Additives may thereby especially for example be UV stabilizers, antistatic agents, slip/anti-block agents, fillers, antioxidants, pigments, fluor elastomers used as polymer processing aids and/or mixtures of two or more thereof. Especially for example an erucamide and/or an oleamide and/or silica and/or talc.

A multi-layer film according to the invention may comprise at least five layers or exactly five layer, wherein the multi-layer film is multi-layer film for silage film applications with two outer layers, two intermediate layers and one core layer, wherein the core layer comprises an ethylene copolymer having a density between ≥0.910 g/cm$^3$ and 0.925 g/cm$^3$, the intermediate layers comprise an ethylene copolymer comprising 1-octene and having a density between >0.910 g/cm$^3$ or >0.915 g/cm$^3$ and 0.925 g/cm$^3$, wherein further the first outer layer comprises either a polyethylene, especially a low density polyethylene, with a density between 0.915 g/cm$^3$ and 0.935 g/cm$^3$ or comprises between 65 wt. % and 93 wt. % of a first ethylene copolymer comprising 1-octene and having a density between >0.915 g/cm$^3$ and 0.925 g/cm$^3$ and between 7 wt. % and 35 wt. % of a second ethylene copolymer having a density between >0.925 g/cm$^3$ and 0.945 g/cm$^3$ based on the total weight of polymers of the layer, wherein further the second outer layer comprises between 35 wt. % and 65 wt. % of a first ethylene copolymer comprising 1-octene and having a density between ≥0.910 g/cm$^3$ or >0.915 g/cm$^3$ and 0.925 g/cm$^3$ and between 35 wt. % and 65 wt. % or 70 wt. % of a second ethylene copolymer having a density between 0.850 g/cm$^3$ and <0.915 g/cm$^3$ based on the total weight of the polymers of the layer, wherein the multi-layer film and/or each of the five layers comprises only polyolefins as polymers and/or wherein further the five layers are adjacent to each other.

The multi-layer films of the present invention may be prepared by any method known in the art. Multi-layer structures may be prepared for example by a blown film co-extrusion process, for example as disclosed in "Film Extrusion Manual", (TAPPI PRESS, 2005, ISBN 1-59510-075-X, Editor Butler, pages 413-435).

For example, in the process of coextrusion, the various resins may be first melted in separate extruders and then brought together in a feed block. The feed block is a series of flow channels which bring the layers together into a uniform stream. From this feed block, this multi-layer material then flows through an adapter and out a film die. The blown film die may be an annular die. The die diameter may be a few centimeters to more than three meters across. The molten plastic is pulled upwards from the die by a pair of nip rolls high above the die (from for example 4 meters to more than 20 meters). Changing the speed of these nip rollers will change the gauge (wall thickness) of the film. Around the die an air-ring may be provided. The air exiting the air-ring cools the film as it travels upwards. In the center of the die there may be an air outlet from which compressed air can be forced into the center of the extruded circular profile, creating a bubble. This expands the extruded circular cross section by some ratio (a multiple of the die diameter). This ratio, called the "blow-up ratio" can be just a few percent to for example more than 300 percent of the original diameter. The nip rolls flatten the bubble into a double layer of film whose width (called the "layflat") is equal to ½ of the circumference of the bubble. This film may then be spooled or printed on, cut into shapes, and heat sealed into bags or other items.

The present invention also concerns a silage comprising a multi-layer film according to the invention.

Furthermore, the present invention also concerns the use of the multi-layer film according to the invention for silage film applications.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

EXAMPLES

Films according to the invention have been produced on a 5-layer co-extrusion blown line as described below.

Line Descriptions and Process Settings:

| Five extruders | five layers |
|---|---|
| Target thickness | 25 μm; |
| BUR | 2.5 |
| Die | gap = 2.4 mm; Ø 550 mm |
| Dual ring | Double flow air ring. Contactless type. |
| Air cooling temperature | 15° C. |
| Ring | 52% of total power |
| IBC | 60% power |
| Line speed | 61 m/min |
| Output | 352 kg/h |

The extruder settings, extruder temperature profiles and die temperature profile were thereby as described below (see Tables 1, 2 and 3).

TABLE 1

Extruder settings

| | Speed rpm | Torque % | Pressure IN Bar | Pressure OUT Bar | Melt C.° |
|---|---|---|---|---|---|
| Extr. A | 54.3 | 19 | 83 | 63 | 215 |
| Extr. B | 55.2 | 54 | 182 | 134 | 217 |
| Extr. C | 23 | 41 | 138 | 97 | 213 |
| Extr. D | 58 | 49 | 170 | 120 | 214 |
| Extr. E | 87.6 | 44 | 165 | 112 | 213 |

TABLE 2

Temperature profiles (C.°)

| | Extruder A | Extruder B | Extruder C | Extruder D | Extruder E |
|---|---|---|---|---|---|
| Zone 1 | 40 | 40 | 40 | 40 | 40 |
| Zone 2 | 210 | 210 | 210 | 210 | 210 |
| Zone 3 | 210 | 210 | 210 | 210 | 210 |
| Zone 4 | 210 | 210 | 210 | 210 | 210 |
| Zone 5 | — | — | 210 | — | — |
| Filter 1 | 210 | 210 | 210 | 210 | 210 |
| Filter 2 | 210 | 210 | 210 | 210 | 210 |
| Filter 3 | 210 | 210 | 210 | 210 | 210 |

TABLE 3

Die temperature profile (C. °)

| zone A1 | zone A2 | zone A3 | zone B | zone C | zone D | zone E | zone F | zone G | Zone I | zone H | Zone L | zone M |
|---|---|---|---|---|---|---|---|---|---|---|---|---|
| 215 | 215 | 215 | 210 | 210 | 210 | 210 | 210 | 210 | 210 | 210 | 210 | 210 |

The layer compositions of the multi-layer films according the invention (samples A1 and A2) are as described below (see Table 4).

TABLE 4

Multi-layer films according to the

| film thickness (%) | extruder layer | sample A1 (composition of layer in wt. %) | sample A2 (composition of layer in wt. %) |
|---|---|---|---|
| 10% | A | 100% LDPE | 100% LDPE |
| 25% | B | 100% SUPEER 8115 | 100% SUPEER 8115 |
| 30% | C | 100% SUPEER 8115 | 100% SUPEER 8115 |
| 25% | D | 100% SUPEER 8115 | 100% SUPEER 8115 |
| 10% | E | 70% COHERE 8570 + 30% SUPEER 8115 | 50% COHERE 8570 + 50% SUPEER 8115 |

LDPE 2501 is commercialy available from SABIC and is an LDPE with a density of 0.925 g/cm3 and an MFR of 0.75 g/10 min.

SUPEER 8115 is commercialy available from SABIC and is a copolymer of ethylene and 1-octene with a density of 0.915 g/cm3 and an MFR of 1.1 g/10 min.

COHERE 8570 is commercialy available from SABIC and is a copolymer of ethylene and 1-octene with a density of 0.868 g/cm3 and an MFR of 5 g/10 min A comparative example of a silage film has been produced on a 5-layer co-extrusion blown line as described below.

Line Descriptions and Process Settings:

| Five extruders | five layers |
|---|---|
| Target thickness | 25 μm; |
| BUR | 2.4 |
| Die | gap = 2.4 mm; Ø 400 mm |
| Air cooling temperature | 15° C. |
| Ring | 51% of total power |
| IBC | 46% power |
| Line speed | 55 m/min |
| Output | 240 kg/h |

The extruder settings, extruder temperature profiles and die temperature profile were thereby as described below (see Tables 5, 6 and 7).

TABLE 5

Extruder settings

| | Kg/h | Kg/h % | Speed rpm | Torque % | Pressure Bar | Melt C. ° |
|---|---|---|---|---|---|---|
| Extr. A | 36 | 15 | 40 | 14 | 196 | 221 |
| Extr. B | 47 | 20 | 53 | 21 | 196 | 219 |
| Extr. C | 73 | 30 | 22 | 45 | 224 | 218 |
| Extr. D | 48 | 20 | 53 | 20 | 181 | 216 |
| Extr. E | 36 | 15 | 42 | 13 | 180 | 223 |

TABLE 6

Temperature profiles (C.°)

|  | Extruder A | Extruder B | Extruder C | Extruder D | Extruder E |
|---|---|---|---|---|---|
| Zone 1 | 40 | 40 | 40 | 44 | 40 |
| Zone 2 | 199 | 186 | 210 | 187 | 198 |
| Zone 3 | 210 | 210 | 210 | 210 | 210 |
| Zone 4 | 210 | 210 | 210 | 210 | 210 |
| Zone 5 | 210 | 210 | 210 | 210 | 210 |
| Zone 6 | 210 | 210 | 210 | 210 | 210 |
| Zone 7 | 210 | 210 | 210 | 210 | 210 |
| Zone 8 |  | 210 |  | 210 |  |

TABLE 7

Die temperature profile (C.°)

| zone 1 | zone 2 | zone 3 | zone 4 | zone 5 | zone 6 |
|---|---|---|---|---|---|
| 210 | 210 | 210 | 210 | 220 | 220 |

The composition of the multi-layer films according to comparative example (A3) with respect to polymers is as described below (Table 8).

TABLE 8

Comparative example

| film thickness (%) | extruder/ layer | sample A3 |
|---|---|---|
| 15% | A | 91% Escorene Ultra FL 00218 + 9% PIB |
| 20% | B | 75% Exceed 2018 HA + 16% Enable 2703 HH + 9% PIB |
| 30% | C | 75% Exceed 2018 HA + 16% Enable 2703 HH + 9% PIB |
| 20% | D | 75% Exceed 2018 HA + 16% Enable 2703 HH + 9% PIB |
| 15% | E | 93% Exceed 1018 HA + 7% PIB |

PIB is a polyisobutylene TAC100 masterbatch commercially available from A. SCHULMAN Inc.

Exceed 2018 HA is commercially available from ExxonMobil and is a copolymer of ethylene and 1-hexene with a density of 0.918 g/cm3 and an MFR of 2 g/10 min.

Exceed 1018 HA is commercially available from ExxonMobil and is a copolymer of ethylene and 1-hexene with a density of 0.918 g/cm3 and an MFR of 1 g/10 min.

Enable 2703 HH is commercially available from ExxonMobil and is a copolymer of ethylene and 1-hexene with a density of 0.927 g/cm3 and an MFR of 0.3 g/10 min.

Escorene Ultra FL 00218 is commercially available from ExxonMobil and is a copolymer of ethylene and vinyl-acetate with a density of 0.940 g/cm3 and an MFR of 1.7 g/10 min.

Based on measurements complying with ASTM D5458, one can see that the average peel cling force is higher for multi-layer films according to the invention (samples A1 and A2) compared to the comparative example A3 both in unstretched state (0% pre-stretch) and at 100% pre-stretch (see values reported below, Table 9).

TABLE 9

TABLE OF ADHESION MEASUREMENTS

|  | Unit | sample A1 | sample A2 | sample A3 |
|---|---|---|---|---|
| Thickness average | μm | 24 | 26 | 23 |
| Thickness st. dev. | μm | 1 | 1 | 1 |
| Peelcling ASTM D5458 23° C./50% RH/pre stretch 0% |  |  |  |  |
| Peel cling force average | N | 3.57 | 3.10 | 3.00 |
| Peel cling force st. dev. | N | 0.12 | 0.14 | 0.20 |
| Peel cling average | N/mm | 0.15 | 0.13 | 0.12 |
| Peel cling st. dev. | N/mm | 0.01 | 0.01 | 0.01 |
| Number of specimens |  | 5 | 5 | 3 |
| Peelcling ASTM D5458 23° C./50% RH/pre stretch 100% |  |  |  |  |
| Peel cling force average | N | 2.89 | 2.24 | 2.21 |
| Peel cling force st. dev. | N | 0.10 | 0.11 | 0.19 |
| Peel cling average | N/mm | 0.12 | 0.09 | 0.09 |
| Peel cling st. dev. | N/mm | 0.00 | 0.00 | 0.01 |
| Number of specimens |  | 5 | 5 | 3 |

The invention claimed is:

1. Multi-layer film comprising at least five layers, with two outer layers, two intermediate layers and one core layer, wherein the core layer comprises an ethylene copolymer having a density between ≥0.910 g/cm$^3$ and 0.925 g/cm$^3$,
   wherein the ethylene copolymer of the core layer comprises 1-hexene or 1-octene,
   wherein the intermediate layers comprise an ethylene copolymer comprising 1-octene and having a density between ≥0.910 g/cm$^3$ and 0.925 g/cm$^3$,
   wherein the first outer layer comprises either
      a polyethylene with a density between 0.915 g/cm$^3$ and 0.935 g/cm$^3$, or
      between 65 wt. % and 93 wt. % of a first ethylene copolymer comprising 1-octene and having a density between >0.915 g/cm$^3$ and 0.925 g/cm$^3$ and between 7 wt. % and 35 wt. % of a second ethylene copolymer having a density between >0.925 g/cm$^3$ and 0.945 g/cm$^3$, based on the total weight of polymers of the first outer layer,
   wherein the second outer layer comprises between 35 wt. % and 65 wt. % of a first ethylene copolymer comprising 1-octene and having a density between ≥0.910 g/cm$^3$ and between 35 wt. % and 65 wt. % of a second ethylene copolymer having a density between 0.850 g/cm$^3$ and <0.915 g/cm$^3$, based on the total weight of the polymers of the second outer layer, and
   wherein each of the five layers comprises only polyolefins as polymers.

2. The multi-layer film according to claim 1, wherein the first outer layer comprises between 70 wt. % and <93 wt. % of the first ethylene copolymer comprising 1-octene and between >7 wt. % and 30 wt. % of the second ethylene copolymer based on the total weight of polymers of the first outer layer, and/or
   wherein the second outer layer comprises between 40 wt. % and 60 wt. % of the first ethylene copolymer comprising 1-octene and between 40 wt. % and 60 wt. % of the second ethylene copolymer based on the total weight of the polymers of the second outer layer, and/or
   wherein the core layer comprises between 90 wt. % and 100 wt. % of the ethylene copolymer based on the total weight of the polymers of the core layer, and/or wherein each intermediate layer comprises between 90 wt. % and 100 wt. % of the ethylene copolymer based on the total weight of the polymers of the intermediate layer.

3. The multi-layer film according to claim 1,
wherein the multi-layer film consists of five layers, and/or
wherein the first outer layer and the second outer layer comprise the same first ethylene copolymer, and/or
wherein the melt flow rate of the ethylene copolymer of the core layer is lower than the melt flow rate of the ethylene copolymer(s) of each of the intermediate layers, and/or
wherein the multi-layer film comprises no polypropylene, and/or
wherein the five layers are adjacent to each other.

4. The multi-layer film according to claim 1, wherein the second ethylene copolymer of the first outer layer comprises 1-hexene or 1-octene.

5. The multi-layer film according to claim 1, wherein the second ethylene copolymer of the second outer layer comprises 1-hexene or 1-octene.

6. The multi-layer film according to claim 1, wherein
the density of the ethylene copolymer of the core layer is between 0.913 and 0.923 g/cm$^3$, and/or
the melt flow rate of the ethylene copolymer of the core layer is between 0.2 and 2.5 g/10min.

7. The multi-layer film according to claim 1, wherein
the density of the ethylene copolymer of the intermediate layer is between 916 g/cm$^3$ and 0.923 g/cm$^3$, and/or
the melt flow rate of the ethylene copolymer of the intermediate layer is between 0.2 and 2.5 g/10 min.

8. The multi-layer film according to claim 1, wherein
the density of the first ethylene copolymer of the first outer layer is between 916 g/cm$^3$ and 0.923 g/cm$^3$, and/or
the melt flow rate of the ethylene copolymer of the intermediate layer is between 0.2 and 2.5 g/10 min.

9. The multi-layer film according to claim 1, wherein
the density of the first ethylene copolymer of the second outer layer is between 916 g/cm$^3$ and 0.923 g/cm$^3$, and/or
the melt flow rate of the first ethylene copolymer of the second outer layer is between 1 and 4 g/10 min.

10. The multi-layer film according to claim 1, wherein
the density of the second ethylene copolymer of the first outer layer is between 0.930 g/cm$^3$ and 0.940 g/cm$^3$, and/or
the melt flow rate of the second ethylene copolymer of the first outer layer is between 1 and 4 g/10 min.

11. The multi-layer film according to claim 1, wherein
the density of the second ethylene copolymer of the second outer layer is between 0.855 g/cm$^3$ and 0.910 g/cm$^3$, and/or
the melt flow rate of the second ethylene copolymer of the second outer layer is between 0.2 and 2.5 g/10 min.

12. The multi-layer film according to claim 1, wherein
the thickness of each outer layer represents between 10% and 20% of a total film thickness, and/or
the thickness of each intermediate layer represents between 15% and 25% of the total film thickness, and/or
the thickness of the core layer represents between 25% and 35% of the total film thickness.

13. Silage comprising the multi-layer film according to claim 1.

14. The multi-layer film of claim 1, comprising at least five layers,
wherein the density of the intermediate layers between >0.915 g/cm$^3$ and 0.925 g/cm$^3$,
wherein the polyethylene of the first outer layer is a low density polyethylene with a density between 0.915 g/cm$^3$ and 0.935 g/cm$^3$,
wherein the first ethylene copolymer of the second outer layer has a density between >0.915 g/cm$^3$ and 0.925 g/cm$^3$, and
wherein the multi-layer film comprises only polyolefins as polymers.

15. The multi-layer film of claim 1, comprising at least five layers,
wherein the density of the intermediate layers between >0.915 g/cm$^3$ and 0.925 g/cm$^3$,
wherein the first outer layer comprises between 65 wt. % and 93 wt. % of a first ethylene copolymer comprising 1-octene and having a density between >0.915 g/cm$^3$ and 0.925 g/cm$^3$ and between 7 wt. % and 35 wt. % of a second ethylene copolymer having a density between >0.925 g/cm$^3$ and 0.945 g/cm$^3$, based on the total weight of polymers of the first outer layer, and
wherein the multi-layer film comprises only polyolefins as polymers.

16. Multi-layer film according to claim 1, wherein the melt flow rate of the ethylene copolymer of the core layer is lower than the melt flow rate of the ethylene copolymer(s) of each of the intermediate layers.

17. The multi-layer film according to claim 1, wherein the multi-layer film comprises no polypropylene.

18. The multi-layer film according to claim 1,
wherein the density of the ethylene copolymer of the core layer is between >0.915 and <0.923 g/cm$^3$, and the melt flow rate of the ethylene copolymer of the core layer is between 0.5 and 1.5 g/10 min,
wherein the density of the ethylene copolymer of the intermediate layer is between >0.916 g/cm$^3$ and <0.923 g/cm$^3$, and the melt flow rate of the ethylene copolymer of the intermediate layer is between 0.5 and 1.5 g/10 min,
wherein the density of the first ethylene copolymer of the first outer layer is between >0.916 g/cm$^3$ and <0.923 g/cm$^3$, and the melt flow rate of the ethylene copolymer of the intermediate layer is 0.5 and 1.5 g/10 min,
wherein the density of the second ethylene copolymer of the first outer layer is between >0.930 g/cm$^3$ and <0.940 g/cm$^3$, and the melt flow rate of the second ethylene copolymer of the first outer layer is between 2.4 and <3.5 g/10 min,
wherein the density of the first ethylene copolymer of the second outer layer is between >0.916 g/cm$^3$ and <0.923 g/cm$^3$, and wherein the melt flow rate of the first ethylene copolymer of the second outer layer is between 2.5 and 3.5 g/10 min, and
wherein the density of the second ethylene copolymer of the second outer layer is between >0.860 g/cm$^3$ and <0.890 g/cm$^3$, and the melt flow rate of the second ethylene copolymer of the second outer layer is between 0.5 and 1.5 g/10 min.

19. Multi-layer film comprising at least five layers, with two outer layers, two intermediate layers and one core layer,
wherein the core layer comprises an ethylene copolymer having a density between ≥0.910 g/cm$^3$ and 0.925 g/cm$^3$,
wherein the intermediate layer comprises an ethylene copolymer comprising 1-octene and having a density between ≥0.910 g/cm$^3$ and 0.925 g/cm$^3$, wherein the first outer layer comprises either
  a polyethylene with a density between 0.915 g/cm$^3$ and 0.935 g/cm$^3$, or
  between 65 wt. % and 93 wt. % of a first ethylene copolymer comprising 1-octene and having a density between >0.915 g/cm$^3$ and 0.925 g/cm$^3$ and between 7 wt. % and 35 wt. % of a second ethylene copolymer having a density between >0.925 g/cm$^3$ and 0.945 g/cm$^3$, based on the total weight of polymers of the first outer layer,
wherein the second outer layer comprises between 35 wt. % and 65 wt. % of a first ethylene copolymer comprising 1-octene and having a density between ≥0.910 g/cm$^3$ and between 35 wt. % and 65 wt. % of a second ethylene copolymer having a density between 0.850 g/cm$^3$ and <0.915 g/cm$^3$, based on the total weight of the polymers of the second outer layer,
wherein each of the five layers comprises only polyolefins as polymers, and
wherein the first outer layer comprises between >75 wt. % and <90 wt. % of the first ethylene copolymer comprising 1-octene and between >10 wt. % and <25 wt. % of the second ethylene copolymer, based on the total weight of polymers of the first outer layer, and/or
wherein the second outer layer comprises between >40 wt. % and <60 wt. % of the first ethylene copolymer comprising 1-octene and between >40 wt. % and <60 wt. % of the second ethylene copolymer, based on the total weight of the polymers of the second outer layer.

20. Multi-layer film comprising at least five layers, with two outer layers, two intermediate layers and one core layer, wherein the core layer comprises an ethylene copolymer having a density between ≥0.910 g/cm$^3$ and 0.925 g/cm$^3$,
wherein the intermediate layers comprise an ethylene copolymer comprising 1-octene and having a density between ≥0.910 g/cm$^3$ and 0.925 g/cm$^3$,
wherein the first outer layer comprises either
  a polyethylene with a density between 0.915 g/cm$^3$ and 0.935 g/cm$^3$, or
  between 65 wt. % and 93 wt. % of a first ethylene copolymer comprising 1-octene and having a density between >0.915 g/cm$^3$ and 0.925 g/cm$^3$ and between 7 wt. % and 35 wt. % of a second ethylene copolymer having a density between >0.925 g/cm$^3$ and 0.945 g/cm$^3$, based on the total weight of polymers of the first outer layer,
wherein the second outer layer comprises between 35 wt. % and 65 wt. % of a first ethylene copolymer comprising 1-octene and having a density between ≥0.910 g/cm$^3$ and between 35 wt. % and 65 wt. % of a second ethylene copolymer having a density between 0.850 g/cm$^3$ and <0.915 g/cm$^3$, based on the total weight of the polymers of the second outer layer,
wherein each of the five layers comprises only polyolefins as polymers, and
wherein the second ethylene copolymer of the first outer layer comprises 1-hexene or 1-octene, and/or wherein the second ethylene copolymer of the second outer layer comprises 1-hexene or 1-octene.

* * * * *